Nov. 11, 1952  J. B. PATON ET AL  2,617,782
METHOD OF MIXING RUBBER
Filed June 30, 1945

INVENTORS
James B. Paton
Frank Jermain Chandler
BY
Barnes, Kisselle, Laughlin & Raisch
Attorneys Patented Nov. 11, 1952

2,617,782

UNITED STATES PATENT OFFICE 2,617,782

METHOD OF MIXING RUBBER

James B. Paton, Dearborn, and Frank Jermain Chandler, Detroit, Mich.

Application June 30, 1945, Serial No. 602,562

7 Claims. (Cl. 260—41.5)

This invention relates to a method of mixing rubber.

In the compounding of rubber it is customary to mix the crude rubber, carbon black, the vulcanizing and accelerating agents, as well as the other active and inert ingredients which compose the final rubber mixture or compound, in a mixer such as the well-known Banbury mixer. The carbon black is in the form of a finely divided powder packaged in paper sacks which are opened up and the contents poured from the bag into the Banbury mixer. Due to the extreme fineness and oily characteristics of the carbon black, much of this carbon black floats as dust in the air contaminating not only the room in which the mixing is done and everything in it, but also the air which the workman must breathe.

It is an object of this invention to produce a method of compounding rubber wherein the powdered ingredients of the rubber mixture are handled and incorporated in the mix without loss and therefore without contaminating the surrounding air and mixing room as above described.

This object is accomplished by packaging the carbon black in a container which is made from a material that will either form a part of the final rubber mixture or which will be inert and not harm or detract or injure the physical and chemical properties of the rubber mixture in which the container material is incorporated. Preferably, the container material is such that it will form an essential part of the rubber mixture, either or both chemically and physically. The container should be of a material which is readily miscible with the rubber mixture at the temperatures at which it is mixed and which will readily disintegrate, either or both chemically or physically, while in the mixer and thus become an essential constituent or harmless ingredient in the rubber mixture.

Among the materials from which we can make our container for carbon black are the following: natural rubber, reclaimed rubber, either natural or synthetic, synthetic rubber, such as Buna S, synthetic rubber, a copolymer of butadiene and styrene; Buna N, a copolymer of butadiene and acrylonitrile; neoprene, a polymer of chloroprene; Butyl rubber, a copolymer of isobutylene and small amounts of unsaturated hydrocarbons such as butadiene or isoprene; Thiokols, synthetic rubbers comprising organic polysulfides; Koroseal, a plasticized vinyl chloride with tricresyl phosphate usually as a plasticizer; and numerous thermoplastic materials such as the vinyl type thermoplastics consisting of copolymers of vinyl chloride and vinyl acetate; Saran, a copolymer of vinylidene chloride and vinyl chloride; and Polythene; Pliofilm, a rubber hydrochloride.

The above, and numerous other thermoplastic materials, are satisfactory as material from which the carbon black container can be made. All of the above materials are readily miscible with the rubber mixture and will not harm nor detract from the properties of the rubber. The package container, or bag material for the carbon black should be such that it can be readily masticated and dispersed into the mixture while in the Banbury mixer such that it will amalgamate with the rubber or other compounds of the mixture, preferably such that it will form a useful part or constituent of the resulting rubber compound, or at least will not detract from the physical and chemical properties of the same.

The mixing or compounding of the rubber in the Banbury mixer is usually done at temperatures ranging from 200° F. to 340° F. This temperature range is only given by way of example and not for purposes of limitation because the rubber might be compounded at much lower or higher temperatures. The important thing is that the temperature at which the rubber is compounded will assist one in choosing the proper material from which to make the bag for the carbon black. If the bag is made from a thermoplastic material, it is preferable to select a thermoplastic material which will become plastic or soft or even melt at mixing temperatures. Sometimes rubber plasticizers are used in the mixer. In such case it is preferable to use a material for the bag which will dissolve or soften in the presence of such plasticizer.

Although we have described above a method for handling and incorporating carbon black in a rubber mixture, it is understood that our method can be used for handling and incorporating all types of comminuted or powdered materials not only in mixtures of natural rubber but also in mixtures of synthetic rubber and thermoplastic materials and accordingly, whenever the term rubber is used in the claims it will be understood to mean both natural rubber and the known types of synthetic rubber.

It is also evident from the above that our method of handling the carbon black or comminuted material obviates the need for disposing of the package in which the material is contained.

Figure 1:
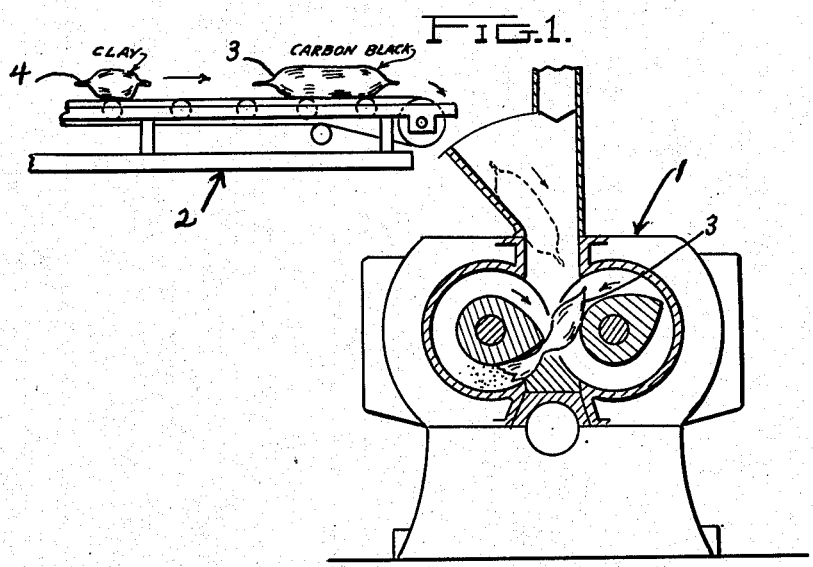
Fig. 1 is a vertical section through a Banbury mixer showing our packaged carbon black being delivered thereto and masticated therein.

In Fig. 1 we have illustrated a conventional mixer 1, commonly known as a Banbury mixer, in which the crude rubber, carbon black, vulcanizing and accelerating agents, plasticizers, as well as other active and inert ingredients which compose the final rubber mixture are thoroughly mixed.

We have also illustrated a conventional conveyor 2 for conveying the package 3 of carbon black, as well as a package 4 of finely divided or powdered clay, into the mixer 1.

Figure 2:
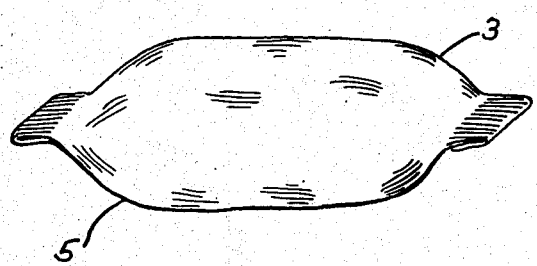
Fig. 2 is an elevation showing our package of carbon black.
Figure 3:
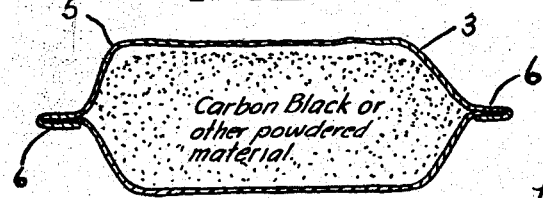
Fig. 3 is a section through the same.

In Figs. 2 and 3 we have one manner of packaging the carbon black in a container or bag 5 of "Pliofilm." Bag 5 is filled with carbon black and the ends 6 are closed and sealed either by cementing or welding by conventional methods.

The bags 5 may themselves be made in a conventional manner either in the form of extruded tubing or from sheet metal which is folded into bag shape and suitably sealed along its edges.

We claim:

1. In the mixing of rubber, the steps of adding to a rubber compound mix in a closed mixer finely divided carbon black enclosed in a bag of polyethylene which is thermoplastic at mixing temperatures and which is miscible with the rubber compound mixture and mixing to disrupt and to disperse the carbon black and polyethylene throughout the mixture.

2. In the mixing of rubber, the steps of adding to a rubber compound mix in a closed mixer finely divided powdered ingredients enclosed in a bag of polyethylene which is thermoplastic at mixing temperatures and which is miscible with the rubber compound mixture and mixing to disrupt and to disperse the powdered ingredients and polyethylene throughout the mixture.

3. In the mixing of rubber, the steps of adding to a rubber compound mix in a closed mixer finely divided powdered ingredients enclosed in a bag of a vinyl chloride polymer which is thermoplastic at mixing temperatures and which is miscible with the rubber compound mix and mixing to disrupt and to disperse the powdered ingredients and the vinyl chloride polymer throughout the mix.

4. In the mixing of rubber, the steps of adding to a rubber compound mix in a closed mixer finely divided powdered ingredients enclosed in a bag of a diolefin-styrene copolymer which is thermoplastic at mixing temperatures and which is miscible with the rubber compound mix and mixing to disrupt and to disperse the powdered ingredients and the diolefin-styrene copolymer throughout the mix.

5. In the mixing of rubber, the steps of adding to a rubber compound mix in a closed mixer finely divided powdered ingredients enclosed in a bag of a diolefin-acrylonitrile copolymer which is thermoplastic at mixing temperatures and which is miscible with the rubber compound mix and mixing to disrupt and to disperse the powdered ingredients and the diolefin-acrylonitrile copolymer throughout the mix.

6. In the mixing of rubber, the steps of adding to the rubber compound mix in a closed mixer finely divided powdered ingredients enclosed in a bag of a substance of the group consisting of polyethylene, vinyl chloride polymer, diolefin-styrene copolymer and diolefin-acrylonitrile copolymer, said substance being thermoplastic at mixing temperatures and being miscible with the rubber compound mix and mixing to disrupt and to disperse the powdered ingredients and the bag material throughout the mix.

7. In the mixing of rubber, the steps of adding to a rubber compound mix in a closed mixer finely divided powdered ingredients enclosed in a bag made of a material consisting of polyethylene which is thermoplastic at mixing temperatures and which is miscible with the rubber compound mixture and mixing to disrupt and to disperse the powdered ingredients and the material of said bag throughout the mixture.

JAMES B. PATON.
FRANK JERMAIN CHANDLER.

REFERENCES CITED

The following references are of record in the file of this patent:

UNITED STATES PATENTS

| Number | Name | Date |
| --- | --- | --- |
| 216,832 | Collins | June 24, 1879 |
| 1,984,927 | Henkel | Dec. 18, 1934 |
| 2,330,698 | Fisher | Sept. 23, 1943 |

FOREIGN PATENTS

| Number | Country | Date |
| --- | --- | --- |
| 328,812 | Great Britain | May 8, 1930 |

OTHER REFERENCES

Swallow: Article in Endeavour, vol. 3, January 1944 (p. 28).